(12) United States Patent
Woolford

(10) Patent No.: US 8,960,623 B2
(45) Date of Patent: Feb. 24, 2015

(54) ADAPTER APPARATUS FOR PORTABLE HANDHELD DEVICE

(71) Applicant: Kurt A Woolford, Libertyville, IL (US)

(72) Inventor: Kurt A Woolford, Libertyville, IL (US)

( * ) Notice: Subject to any disclaimer, the term of this patent is extended or adjusted under 35 U.S.C. 154(b) by 0 days.

(21) Appl. No.: 13/678,939

(22) Filed: Nov. 16, 2012

(65) Prior Publication Data

US 2013/0168514 A1 Jul. 4, 2013

Related U.S. Application Data

(60) Provisional application No. 61/582,923, filed on Jan. 4, 2012.

(51) Int. Cl.
*A47K 1/08* (2006.01)
*F16M 13/00* (2006.01)
*F16M 11/04* (2006.01)

(52) U.S. Cl.
CPC .............. *F16M 13/00* (2013.01); *F16M 11/041* (2013.01)
USPC .......................... 248/311.2; 379/454; 224/545

(58) Field of Classification Search
USPC .......... 248/311.2, 309.1, 311.3, 316.1, 316.7, 248/177.1, 187.1; 224/929, 930, 545, 547; 379/454, 455
See application file for complete search history.

(56) References Cited

U.S. PATENT DOCUMENTS 6,062,518 A * 5/2000 Etue .......................... 248/231.21
6,141,417 A * 10/2000 Lopez et al. .................. 379/446
6,991,384 B1 1/2006 Davis
7,099,467 B1 * 8/2006 Rohrbach ...................... 379/446
7,128,297 B2 * 10/2006 Lee ............................. 248/187.1
7,413,155 B2 * 8/2008 Seil et al. ..................... 248/311.2
7,594,631 B1 * 9/2009 Carnevali .................... 248/219.4
D669,065 S * 10/2012 Fromm ......................... D14/253
2003/0234327 A1 * 12/2003 Nakatani .................... 248/177.1
2005/0122424 A1 6/2005 Overstreet ..................... 348/373
2009/0069744 A1 * 3/2009 Goodnow ....................... 604/66
2010/0171009 A1 7/2010 Lin
2012/0285907 A1 * 11/2012 Emmons ......................... 211/26
2013/0175413 A1 * 7/2013 Waugh ........................ 248/124.1

FOREIGN PATENT DOCUMENTS

KR 10-2006-0030953 4/2006

OTHER PUBLICATIONS

Internet Web Site: www.promomarketing.com—Teaches a cell phone stand LINK: http://www.promomarketing.com/promotional-product/Cell-Phone-Stand/608301.

(Continued)

*Primary Examiner* — Steven Marsh
(74) *Attorney, Agent, or Firm* — Valauskas Corder LLC

(57) ABSTRACT

An adapter apparatus interfaces an accessory including a portable handheld device and a mounting product for a physically secure and stabilized assembly for stabilized, hands-free functionality. The adapter apparatus is ergonomically designed to enable optimal viewing angles of a portable handheld device as well as facilitate neutral postures of a user through elevation of the portable handheld device to improve head and neck posture of a user thereby increasing comfort and minimizing neck pain of the user.

9 Claims, 4 Drawing Sheets

(56) References Cited

OTHER PUBLICATIONS

Internet web site www.google.com/imgres—a tripod for a cell phone LINK: http://www.google.com/imgres?q=cell+phone+stand+tripod&hl=en&safe=active&biw=1024&bih=571&gbv=2&tbm=isch&tbnid=xwHh3_UUPPnuMM:&imgrefurl=http://www.aliexpress.com/product-fm/513682090-Universal-Mobile-Cell-Phone-Camera-Stand-Tripod-Holder-2354-wholesalers.html&docid=BevzEb_WoS3pAM&imgurl=http://i01.i.aliimg.com/img/pb/676/992/423/423992676_643.jpg&w=500&h=500&ei=TUEXT4SpNYrd0QGp44nnAg&zoom=1&iact=hc&vpx=374&vpy=227&dur=203&hovh=225&hovw=225&tx=119&ty=81&sig=111369371928075838590&page=1&tbnh=127&tbnw=135&start=0&ndsp=12&ved=1t:429,r:2,s:0.

Internet web site www.allputerlcom.com/imgres—Teaches tripod adaptor for I-phone LINK: http://www.allputer.com/index.php?main_page=product_info&cPath=54_70&products_id=1449.

Internet web site www.bing.com/images . LINK: http://www.flickr.com/photos/joycespics/6710813979/.

* cited by examiner

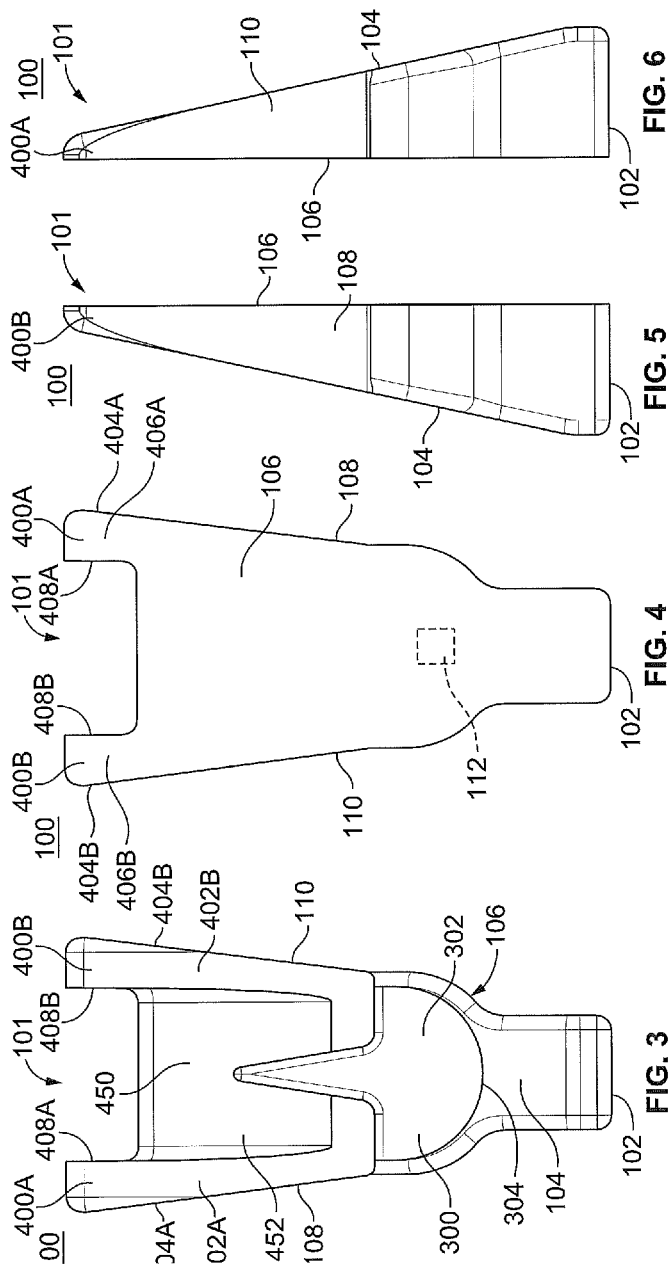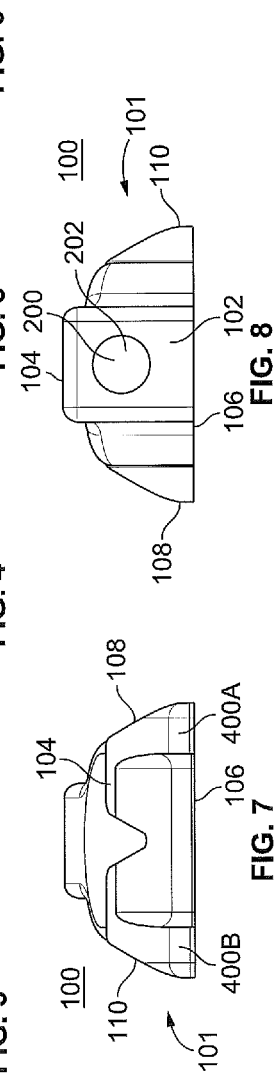

ADAPTER APPARATUS FOR PORTABLE HANDHELD DEVICE

CROSS-REFERENCE TO RELATED APPLICATIONS

This application claims the benefit of U.S. Provisional Patent Application Ser. No. 61/582,923 filed Jan. 4, 2012.

FIELD OF THE INVENTION

The present invention relates generally to portable handheld devices and more specifically to accessories for portable handheld devices, particularly lightweight and portable adaptors that enable stabilized, secure, and elevated, hands-free functionality.

BACKGROUND OF THE INVENTION

A portable handheld device includes, for example, cell phone, personal digital assistant (PDA), smartphone, e-readers, or tablet computers to name a few. Portable handheld devices are compact, lightweight, easily transportable, and offer a variety of features and applications, including for example, Internet web browsing, e-mail, media streaming, video conferencing, video recording, image capture, global positioning system (GPS) navigation, video gaming, and document review.

Most portable handheld devices have optional accessories to provide additional functionality. Accessories include, for example, protective covers, carrying cases, sleeves, belt clips, holsters, docks and kickstands. Protective covers, carrying cases, and sleeves protect portable handheld devices. Belt clips are typically spring-loaded clips that facilitate fastening of the portable handheld device onto a pocket or belt so that the device can be conveniently carried by a user. Holsters include an integrated combination of a belt clip with a carrying case. Docks are appliances to which a portable handheld devices are connected. Docks may be used to charge the portable handheld device, listen to music, or to easily view the device from a dashboard or windshield. Kickstands support portable handheld devices in either a portrait or landscape mode in a stabilized and secure manner without the use of hands ("hands-free").

Certain features of portable handheld devices such as video recording and image capture utilize a camera for capturing still photographs or recording, reproducing, or broadcasting moving or dynamic visual images including video conferencing.

One problem with the capture of still photographs or the recording of dynamic images is known as the "shake effect", which is caused by even the slightest wavering hand. As a result, the capture of a still photograph results in poor clarity of the image regardless of the number of camera megapixels. With video recording, the shake effect causes jitter in the dynamic images.

There are limited accessories available for handheld portable devices that allow a user to use certain features and applications of the device in a stabilized and secure hands-free manner such as to minimize or eliminate shake effect.

Another problem is that the use of portable handheld devices is associated with high head and neck flexion postures as compared with desktop computing devices. Head and neck flexion postures are affected by where the device is positioned during use such as on a table or the user's lap. High head and neck flexion postures are sometimes referred to as "text neck". Specifically, text neck is a repetitive stress injury, involving the head, neck and shoulders resulting from excessive strain from looking at a portable handheld device in either a forward or downward position. Text neck is known to cause fatigue, headaches, neck pain, back pain, shoulder and arm pain, breathing compromise, and much more.

Certain studies suggest that head and neck posture can be improved through accessories designed to allow for optimal viewing angles while facilitating more neutral postures thereby increasing the comfort of the user. Currently available accessories fail to elevate portable handheld devices from a table or user's lap to an ergonomic eye level in order to reduce the effects of text neck.

What is needed is an apparatus that enables stabilized, hands-free functionality for portable handheld devices that can be used with existing products for portable handheld devices such as holsters and belt clips and additionally, an apparatus that is ergonomically designed to minimize neck pain and discomfort. The present invention satisfies these needs.

SUMMARY OF THE INVENTION

The present invention is an adapter apparatus that is ergonomically designed to enable optimal viewing angles of a portable handheld device as well as facilitate neutral postures of a user through elevation of the portable handheld device. Providing optimal viewing angles and elevation of a portable handheld device improves head and neck posture of a user to increase comfort and minimize neck pain of the user, specifically reducing the effects of text neck. Furthermore, the adapter apparatus of the present invention enables stabilized, hands-free functionality for portable handheld devices.

The adapter apparatus according to the present invention provides a universal design that can function with portable handheld devices of various sizes, for example, large tablets and small smartphones. The design of the adapter apparatus further encompasses a small form factor to enable portability as well as fit in a user's pocket. The adapter apparatus may be constructed from a durable material such as nylon, steel, metal, aluminum, and plastic including polyvinyl chloride (PVC), polyethylene, and polypropylene, or any combination thereof.

Specifically, the adapter apparatus according to the present invention interfaces an accessory that includes the portable handheld device and a mounting product to provide a physically secure and stabilized assembly for a variety of applications discussed more fully below. In one embodiment of the invention, the accessory is a belt clip accessory or holster accessory. As mentioned above, belt clips are typically spring-loaded clips that facilitate fastening of the portable handheld device onto a pocket or belt and holsters include an integrated combination of a belt clip with a carrying case. Mounting products include, for example, tripods, monopods, suction mounts.

The adapter apparatus according to the present invention provides for quick and easy attachment/detachment of portable handheld devices. The adapter apparatus includes a receptacle component configured to attach to a mounting product. In one embodiment, the receptacle component is a ¼-20 female threaded insert designed to engage with a ¼-20 UNC male threaded bolt of a mounting product.

The adapter apparatus also includes a cavity component configured to receive a portion of an accessory. In one embodiment, a portion of a belt clip accessory or holster accessory is inserted within the cavity component. The belt clip accessory or holster accessory is engaged with the potable handheld device.

It is contemplated that the cavity component may further include a conformable material component which is designed to be impressed by the portion of the accessory, for example, the clip portion of the belt clip or holster. The conformable material may further secure the accessory.

It is contemplated that an attachment component may be necessary when utilizing the adapter apparatus of the present invention with a belt clip. Specifically, the attachment component may be anything that fastens the belt clip to a portable handheld device either directly or indirectly, such as through a carrying case. Since a holster includes an integrated combination of a belt clip with a carrying case, the attachment component is not necessary when the adapter apparatus of the present invention is used with a holster accessory. However, it is contemplated that the adapter apparatus may include an attachment component on one or more of the surfaces of the adapter apparatus.

There are a variety of contemplated applications for the adapter apparatus of the present invention when assembled with an accessory and a mounting product, for example, insertion to belt clip and attachment of a miniature tripod to enable hands-free video e.g., movie watching in horizontal orientation, video chat in portrait orientation; insertion to belt clip and attachment to standard tripod to enable jitter free video recording and picture capture from a static, stationary or fixed position; and insertion to belt clip and attachment to a handheld stabilizing mount, e.g. steadicam, to enable jitter free video recording and picture capture from an active, moving, or dynamic motion.

The scope of the invention is not limited and those of skill in the art will recognize changes, substitutions and other modifications. For example, the adapter apparatus may include an inductive charging mechanism used to charge the portable handheld device when the portable handheld device is either in close proximity to the adapter apparatus or engaged with the adapter apparatus via the accessory such as belt clip or holster.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention will be described in conjunction with the appended drawings provided to illustrate and not to the limit the invention, where like designations denote like components, and in which:

FIG. 3 is a front view of the adapter apparatus according to the present invention;

FIG. 4 is a rear view of the adapter apparatus according to the present invention;

FIG. 5 is a first side view of the adapter apparatus according to the present invention;

FIG. 6 is a second side view of the adapter apparatus according to the present invention;

FIG. 7 is a top view of the adapter apparatus according to the present invention;

FIG. 8 is a bottom view of the adapter apparatus according to the present invention;

DESCRIPTION OF PREFERRED EMBODIMENTS

Figure 1:
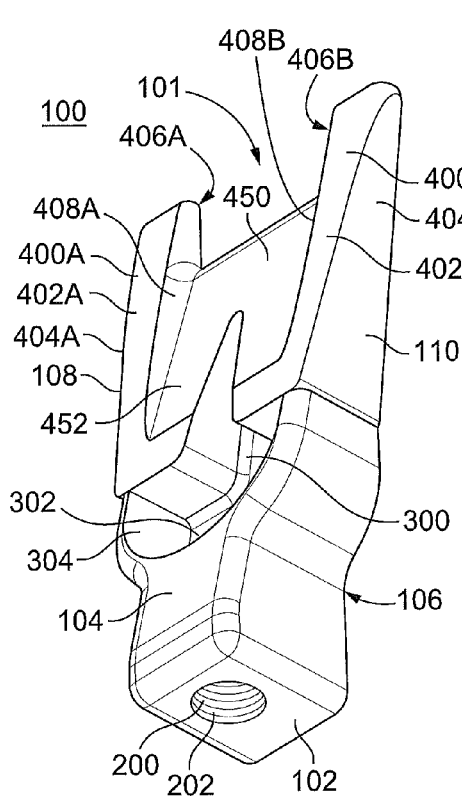
FIG. 1 is a perspective view of an adapter apparatus according to one embodiment of the present invention.
Figure 2:
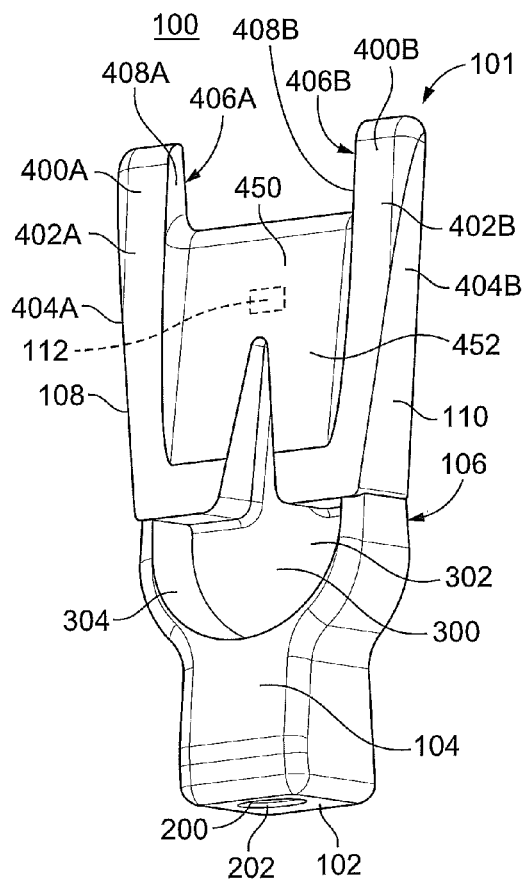
FIG. 2 is an alternate perspective view of the adapter apparatus according to the present invention.

The adapter apparatus according to the present invention provides for quick and easy attachment/detachment of portable handheld devices. The adapter apparatus attaches to a mounting product and an accessory.

As shown in FIGS. 1-8, the adapter apparatus 100 comprises a body 101 including a bottom surface 102, a front surface 104, a back surface 106, a first side surface 108, and a second side surface 110.

The bottom surface 102 includes a receptacle component 200 configured to attach to a mounting product. In one embodiment, the receptacle component 200 is a ¼-20 female threaded insert 202 configured to engage with a standard ¼-20 UNC male threaded bolt of a mounting product. It is contemplated that the receptacle component may be anything that facilitates attachment to a mounting product, including, for example, a quick release plate, hot shoe, magnet, Velcro, or snap fit engagement. Mounting products include for example, tripods, monopods, suction mounts as well as any other mounting product that includes a standard ¼-20 UNC male threaded bolt that engages with a standard ¼-20 female threaded insert to allow for a secure connection.

In one embodiment, the front surface 104 is chamfered. For example, the front surface 104 is chamfered at an approximate 45 degree angle, but any angle is contemplated including a 0 degree angle such that the front surface 104 is substantially parallel to the back surface 106. The adapter apparatus also includes a cavity component 300 configured to receive a portion of an accessory that is engaged with the potable handheld device.

The cavity component 300 includes a support face 302 and a perimeter face 304. In one embodiment, the cavity component 300 is sized and shaped to receive the belt clip accessory or holster accessory.

A belt clip accessory or holster accessory includes a clip body with a tongue portion at one end and a hinge portion at the other end. The hinge portion connects the clip body to a back plate of the belt clip accessory or holster accessory. Specifically, the tongue portion of the clip body is received within the cavity component 300 of the adapter apparatus 100.

It is contemplated that the cavity component 300 may further include a conformable material component. The conformable material component may be positioned on the support face 302, perimeter face 304, or both. The conformable material is designed to be impressed by the portion of the accessory inserted within the cavity component 300 to further secure the accessory.

It is also contemplated that any one of the surfaces—bottom surface 102, a front surface 104, a back surface 106, a first side surface 108, and a second side surface 110—may include an inductive charging mechanism 112 used to charge the portable handheld device when the portable handheld device is either in close proximity to the adapter apparatus or engaged with the adapter apparatus.

The adapter apparatus 100 further includes a pair of guide post components 400A, 400B and a guide platform component 450 to assist engaging the accessory with the adaptor apparatus 100. Specifically, the guide post components 400A, 400B along with the guide platform component 450 steer or lead the clip body of the belt clip accessory or holster accessory such that the tongue portion is received within the cavity component 300.

The guide platform component 450 includes a platform surface 452. The first guide post component 400A includes a first border 402A, a second border 404A, a third border 406A, and a fourth border 408A. The second guide post component 400B includes a first boundary 402B, a second boundary 404B, a third boundary 406B, and a fourth boundary 408B. The first border 402A of the first guide post component 400A and the first boundary 402B of the second guide post component 400B are integrated with the front surface 104 of the body 101 of the adapter apparatus 100. The second border 404A of the first guide post component 400A is integrated with the first side surface 108 of the body 101 of the adapter apparatus 100. The second boundary 404B of the second guide post component 400B is integrated with the second side surface 110 of the body 101 of the adapter apparatus 100. The third border 406A of the first guide post component 400A and the third boundary 406B of the second guide post component 400B are integrated with the back surface 106 of the body 101 of the adapter apparatus 100. A first segment of the fourth border 408A of the first guide post component 400A and a first segment of the fourth boundary 408B of the second guide post component 400B are joined with the platform surface 452 of the guide platform component 450. A second segment of the fourth border 408A is joined between the first border 402A and the third border 406A of the first guide post component 400A. A second segment of the fourth boundary 408B is joined between the first boundary 402B and the third boundary 406B of the second guide post component 400B.

Figure 9:
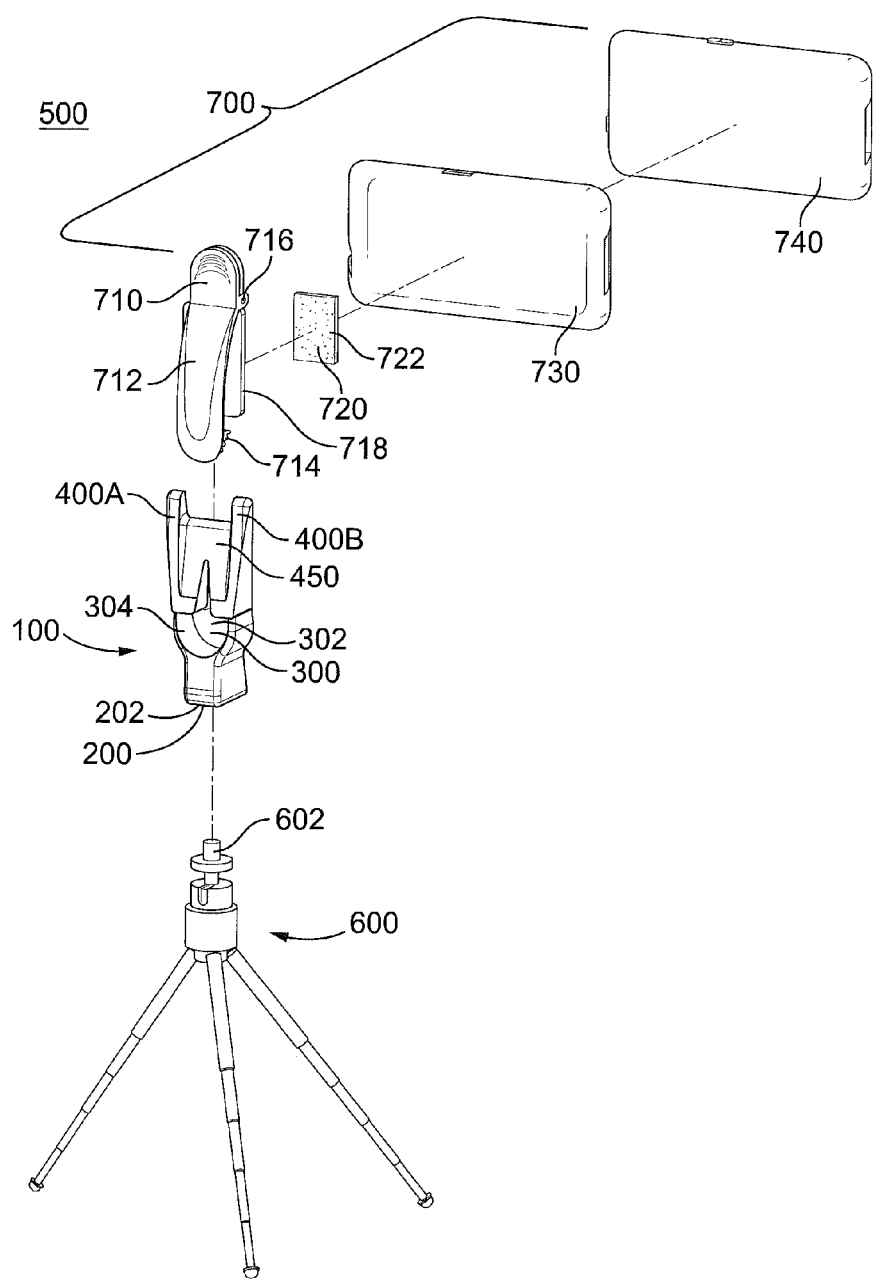
FIG. 9 is an exploded assembly view including the adapter apparatus, an accessory, and a mounting product according to one embodiment of the present invention.
Figures 10, 11:
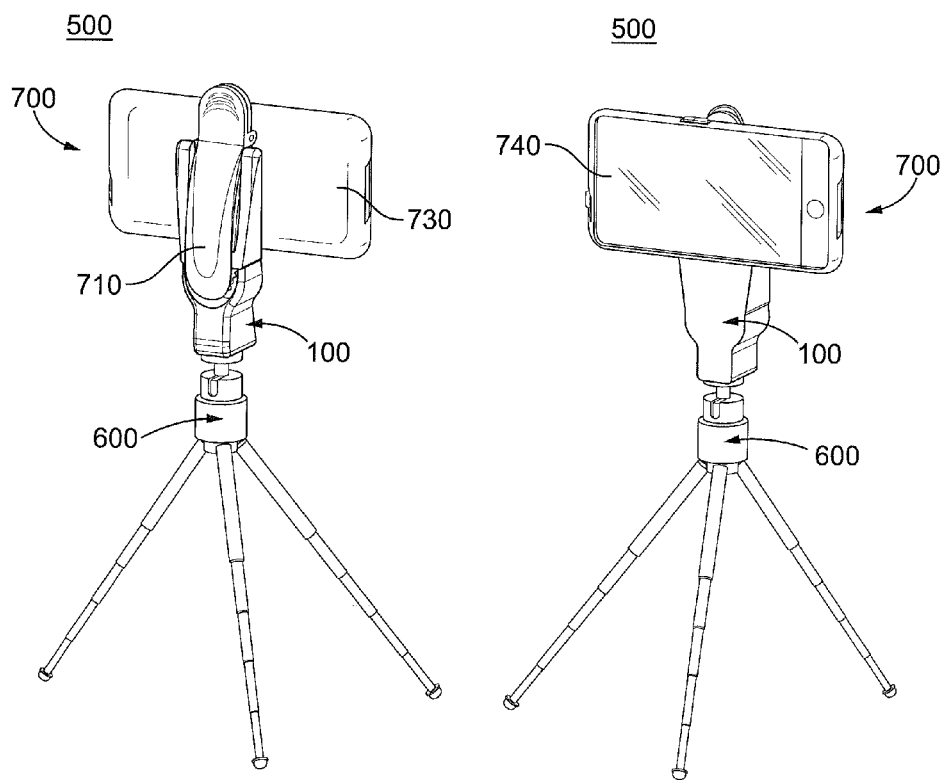
FIG. 10 is a rear assembled view including the adapter apparatus, an accessory, and a mounting product according to the present invention.
FIG. 11 is a front assembled view including the adapter apparatus, an accessory, and a mounting product according to the present invention.

FIGS. 9-11 illustrate an assembly 500 including the adapter apparatus 100 of the present invention. Specifically, FIG. 9 is an exploded view of the assembly 500, FIG. 10 is a rear view of the assembly 500, and FIG. 11 is a front view of the assembly 500. The assembly 500 interfaces the adapter apparatus 100 with an accessory 700 and a mounting product 600.

The mounting product 600 shown in FIGS. 9-11 as a tripod, attaches to the adaptor apparatus 100 through the receptacle component 200 on the bottom surface 102. Specifically, ¼-20 female threaded insert 202 engages with a standard ¼-20 UNC male threaded bolt 602 of the tripod.

The accessory 700 as shown in FIGS. 9-11 include a belt clip 710, attachment component 720, carrying case 730. The accessory 700 also includes the portable handheld device 740.

The belt clip 710 includes a clip body 712 with a tongue portion 714 at one end and a hinge portion 716 at the other end. The hinge portion 716 connects the clip body 712 to a back plate 718 of the belt clip 710.

The clip body 712 is guided to engage with the adapter apparatus 100 by the guide post components 400A, 400B and the guide platform component 450 such that the tongue portion 714 is received within the cavity component 300 of the adapter apparatus 100. Specifically, the tongue portion 714 of the belt clip 710 is retained by the support face 302 and the perimeter face 304 of the cavity 300.

With the embodiment described in reference to FIGS. 9-11, an attachment component 720 is necessary. As shown, the attachment component 720 is a double-sided adhesive pad 722, however, the attachment component 720 may be anything that fastens the belt clip 710 to a portable handheld device 740 either directly or indirectly. In the described embodiment, the attachment component 720 indirectly fastens the belt clip 710 to the portable handheld device 740 through a carrying case 730.

The double-sided adhesive pad 722 is secured to the back plate 718 of the belt clip 710 on one side and secured to the carrying case 730 on the other side. The portable handheld device 740 is positioned within the carrying case 730.

The adapter apparatus 100 in combination with an accessory 700 and a mounting product 600 provides a physically secure and stabilized assembly 500 for a variety of applications, for example, hands-free video, jitter free video recording and picture capture from a static, stationary or fixed position or from an active, moving, or dynamic motion.

The described embodiments are to be considered in all respects only as illustrative and not restrictive, and the scope of the invention is not limited to the foregoing description. Those of skill in the art will recognize changes, substitutions and other modifications that will nonetheless come within the scope of the invention and range of the claims.

The invention claimed is:

1. An adapter apparatus interfacing a holster accessory and a mounting product, wherein the holster accessory includes a clip body with a tongue portion, the holster accessory configured to receive a portable handheld device such that the adapter apparatus provides a secure and stabilized assembly for a variety of applications, the adapter apparatus comprising:
  a body including a bottom surface, a front surface, a back surface, a first side surface, and a second side surface;
  a receptacle component positioned on the bottom surface, the receptacle component for attaching to the mounting product;
  a cavity component positioned on the front surface, the cavity component for receiving the tongue portion of the holster accessory.

2. The adapter apparatus of claim 1, wherein the receptacle component is a ¼-20 female threaded insert designed to engage with a ¼-20 UNC male threaded bolt of the mounting product.

3. The adapter apparatus of claim 1, wherein the adapter apparatus further comprises an inductive charging mechanism to charge the portable handheld device.

4. An adapter apparatus interfacing a holster accessory and a mounting product, wherein the holster accessory is configured to receive a portable handheld device such that the adapter apparatus provides a secure and stabilized assembly for a variety of applications, the adapter apparatus comprising:
  a body including a bottom surface, a front surface, a back surface, a first side surface, and a second side surface;
  a receptacle component positioned on the bottom surface, the receptacle component for attaching to the mounting product;
  a cavity component position on the front surface, the cavity component for receiving a portion of the holster accessory; and
  a pair of guide post components and a guide platform component to assist engaging the holster accessory with the adaptor apparatus.

5. The adapter apparatus of claim 4, wherein the receptacle component is a ¼-20 female threaded insert designed to engage with a ¼-20 UNC male threaded bolt of the mounting product.

6. The adapter apparatus of claim 4, wherein the adapter apparatus further comprises an inductive charging mechanism to charge the portable handheld device.

7. An adapter apparatus interfacing a holster accessory and a mounting product, wherein the holster accessory is configured to receive a portable handheld device such that the adapter apparatus provides a secure and stabilized assembly for a variety of applications, the adapter apparatus comprising:
- a body including a bottom surface, a front surface, a back surface, a first side surface, and a second side surface;
- a receptacle component positioned on the bottom surface, the receptacle component for attaching to the mounting product;
- a cavity component position on the front surface, the cavity component for receiving a portion of the holster accessory, the cavity component comprising a conformable material component designed to be impressed by the portion of the holster accessory.

8. The adapter apparatus of claim 7, wherein the receptacle component is a ¼-20 female threaded insert designed to engage with a ¼-20 UNC male threaded bolt of the mounting product.

9. The adapter apparatus of claim 7, wherein the adapter apparatus further comprises an inductive charging mechanism to charge the portable handheld device.

* * * * *